April 16, 1963 W. M. SANDERSON 3,085,615
FLAT TIRE WARNING DEVICE
Filed April 4, 1960 2 Sheets-Sheet 1

*INVENTOR.*
WILLIAM M. SANDERSON
BY
*J.B. Holden*
ATTORNEY

April 16, 1963 W. M. SANDERSON 3,085,615
FLAT TIRE WARNING DEVICE
Filed April 4, 1960 2 Sheets-Sheet 2

*INVENTOR.*
WILLIAM M. SANDERSON
BY
J. B. Holden
ATTORNEY

United States Patent Office 3,085,615
Patented Apr. 16, 1963

3,085,615
FLAT TIRE WARNING DEVICE
William M. Sanderson, Cuyahoga Falls, Ohio, assignor to The Goodyear Tire & Rubber Company, Akron, Ohio, a corporation of Ohio
Filed Apr. 4, 1960, Ser. No. 19,798
20 Claims. (Cl. 152—340)

The present invention relates to an improvement in safety tires provided with at least two chambers, an inner rim adjacent chamber and an outer tire adjacent chamber disposed radially outward of the inner chamber. A circumferentially extending substantially impervious dividing wall separates the two chambers, both of which are inflated during normal operation. On loss of air from the outer chamber, due to a slow leak or a blowout, the inner chamber acts as a reserve tire with the circumferential dividing wall forming the outer tread thereof. The reserve tire rolls and slides on the inner circumferential surface of the road-contacting tire during emergency operation and a lubricant is provided between the contacting surfaces whereby under emergency operation the reserve tire may ride on the outer tire without causing excessive abrasion.

One object of the invention is to provide in a tire of this type, a simple means for warning the driver that the outer chamber has failed.

Specifically, an object of the invention is to provide a dividing wall of normally uniform cross-section circumferentially so constructed that when only the inner chamber of the tire is inflated, the wall will expand in a non-uniform manner to provide an uneven operation of the inner tire under emergency operating conditions, which in turn will transmit a vibration to the tire wheel sufficient to be noticeable to the driver.

A further object is to build a warning device into the dividing wall in such a way that it will be effective and yet will not materially increase the cost of manufacture and will permit use of existing equipment.

A still further object of this invention is to mold permanent depressions in the outer circumference of the dividing wall at the circumference.

The present invention is shown embodied in a tubeless tire and rim combination having the dividing wall formed by a diaphragm which has the opposite edges thereof sealed in airtight relation to the tire and rim. It is also shown embodied in a tube-type tire and tube combination in which the outer circumferential portion of the tube forms the dividing wall.

Numerous warning devices have been devised for indicating to the driver that a tire has a low pressure or has failed. These in general comprise special mechanisms which indicate visually or audibly that a failure has occurred. A great many of these devices involve the use of expensive or precision equipment. The present invention is simple and inexpensive and yet is reliable since there is no complicated mechanism to get out of order.

Other objects and advantages of this invention will become apparent hereinafter as the description thereof proceeds, the novel features, arrangements and combinations being clearly pointed out in the specification as well as the claims thereunto appended.

Figure 1:
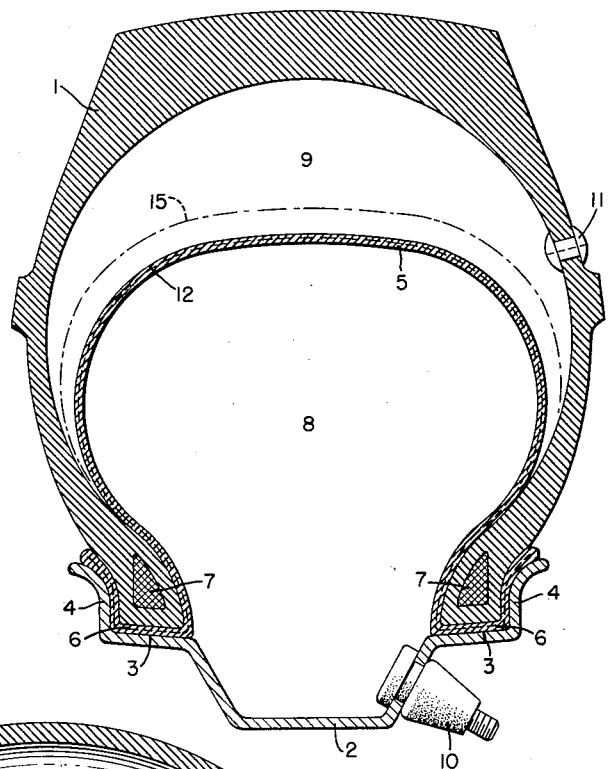
FIG. 1 is a transverse cross-section through a tire and rim embodying the invention.
Figure 2:
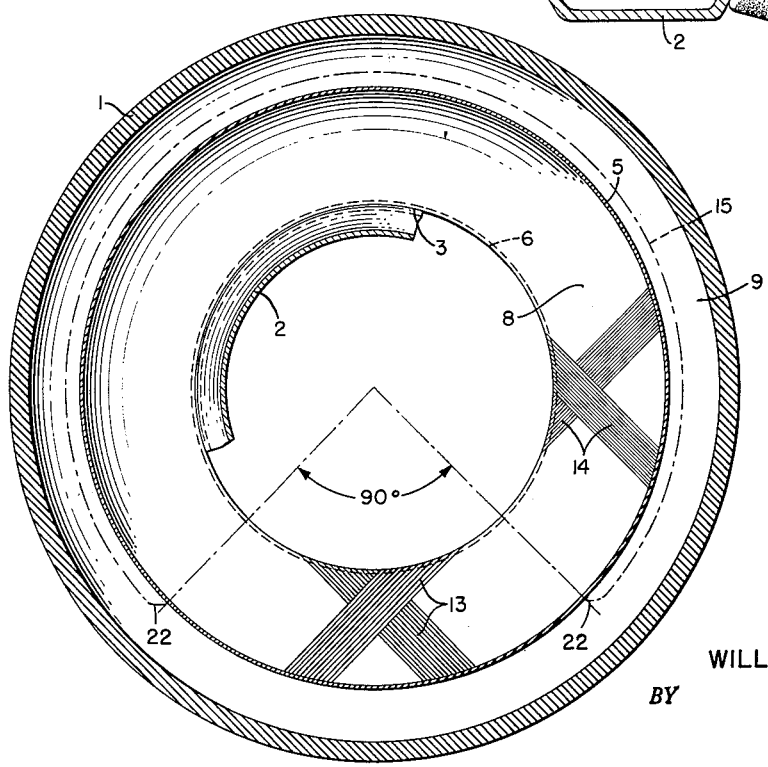
FIG. 2 is a cross-section through a tire and rim taken in a plane perpendicular to the axis of rotation thereof.
Figure 5:
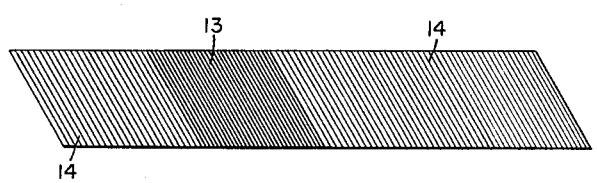
Figure 6:
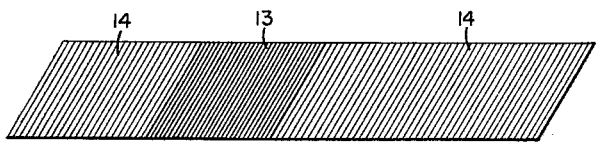
Figure 7:
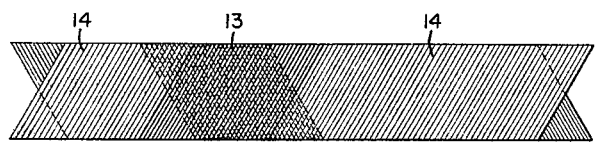
Figure 8:
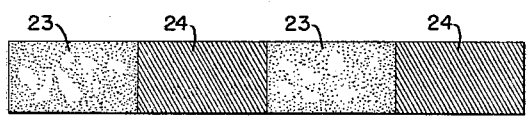
Figure 9:
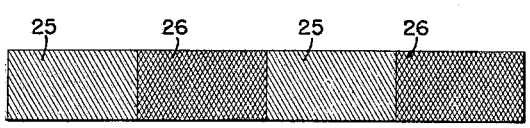

FIGS. 5, 6 and 7 illustrate schematically the manner of building up the outer wall of the diaphragm illustrated in FIGS. 1 and 2; and FIGS. 8 and 9 show alternative constructions to that shown in FIG. 7.

In FIGS. 1 and 2 of the drawings a tubeless tire 1 is shown mounted on a drop center rim 2 having bead-receiving seats 3 and side flanges 4. An air impervious or substantially impervious diaphragm 5 has the lateral edges 6 thereof arranged between the bead seats 3 and flange 4 of the rim 2 and the beads 7 of the tire 1. This diaphragm forms a dividing wall for dividing the container formed by the tire and rim into two independent air chambers, an inner chamber 8 and an outer chamber 9. A lubricant is placed in the chamber 9 to permit sliding of the reserve tire on the inner circumference of the tire to minimize abrasion, or a lubricated layer of rubber may be applied to one of the opposed surfaces of the tire and diaphragm. When a blowout or puncture occurs in the tire 1, air is lost from the outer chamber 9 while air is still retained in the inner chamber 8 since the inner and outer chambers are independent and are inflated by air supplied through the valves 10 and 11 respectively. The diaphragm is shown with a reinforcing layer 12 for restricting expansion thereof. This layer 12 in its preferred form is more specifically described in connection with the description of FIGS. 5, 6 and 7. Note that the reinforcing layer 12 has the ends thereof extending around the beads 7 of the tire so as to be held firmly between the beads and the rim when the tire is inflated.

Tires such as these in which the reinforcing layer 12 is uniformly constructed throughout have proven very successful in recent years, but there has been one drawback, namely, that when air is lost from the outer chamber, particularly by a slow leak in the tire, the driver of the vehicle in most cases is not aware of this condition due to the smooth rolling of the diaphragm on the inner circumference of the tire and he may drive the vehicle for a long period of time before discovering that the outer chamber has failed. Or, worse yet, he may drive the tire until the diaphragm fails with results similar to what would be expected from failure of a tire not equipped with a safety chamber or reserve tire.

The present invention provides a simple means for warning the driver that the outer chamber has failed which means does not materially increase the cost of the tire combination. At the same time, it provides a warning device that is insistent enough to create a desire on the part of the driver to stop and have a repair made as soon as practicable without requiring him to make a forced stop.

The present invention accomplishes these results preferably by using a dividing wall which, in its unstressed state, has a uniform cross-section circumferentially, the same as dividing walls presently used in tires of this general type. It is constructed to provide, under emergency operation, high and low spots on the circumference of the dividing wall. These high and low spots should be spaced sufficiently to insure a decided vibration to the wheel which may be detected by the driver. In other words, it is an object of this invention to provide in a construction of this kind a protuberance or lobe on the dividing wall for creating a substantial repetitive impact to the wheel and associated parts which impacts may be felt or heard by the driver.

Normally diaphragms of this type are provided with strength cords which are non-stretchable or are of uniform limited stretchablility so that a true rolling radius is provided for the reserve tire formed by the diaphragm and rim under emergency operation. However, the diaphragm of this invention is provided with low stretch or inextensible cords 13 for about 90° of its circumference and cords 14 having greater stretch than cords 13 in the balance of its circumference whereby the diaphragm, after tire failure, enlarges to a greater extent in the circumferential areas provided with the cords 14 as indicated by the dotted lines 15 in FIGS. 1 and 2 to form a radial protuberance or lobe on the dividing wall. This produces a non-concentric circumference and as the wheel rotates an impact is produced on the wheel due to the non-uniform rolling radius of the diaphragm. This vibration is transmitted to other parts of the car and particularly to the steering wheel, thus notifying the driver of a tire failure. The circumferential and radial extent of the protuberance need be only sufficient to obtain the desired vertical movement of the rim to cause a sensible vibration which is imparted to the axle through the wheel as will be well understood by anyone skilled in the art. The specific amounts set forth herein have been found to be practical for the purposes set forth but are not to be considered as limiting except as specifically included in the claims.

For the sake of clarity in the claims the term "inner circumference" of the tire means the interior surface of the tire 1 adjacent the tread area thereof and the term "reserve tire" means those elements defining the inner chamber and including the dividing wall formed by the diaphragm or by a tube in case a tube is used. The term "pressure" as used in the claims means pressures in excess of atmospheric pressure, such pressure being sufficient for normal operation under normal and emergency operation.

Figure 3:
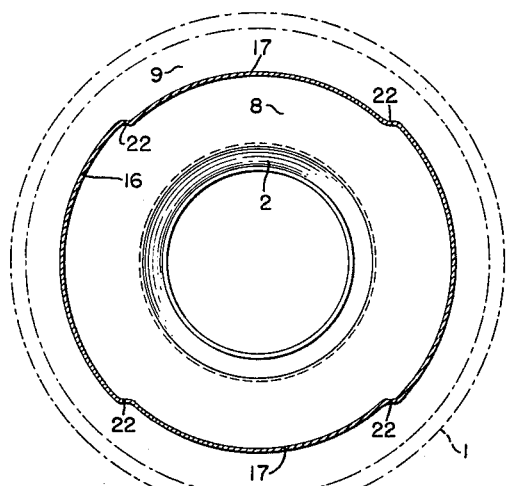
FIG. 3 is a view similar to FIG. 2 showing a modification of the invention.

In FIG. 3 there is shown a diaphragm 16 having a shape similar to that shown in FIG. 2, but in this case there are two low areas 17 molded in the surface of the diaphragm so that even under normal conditions the circumference of the dividing wall has fixed depressions forming radially projecting lobes therebetween therein. The other reference numerals used in this figure correspond to the same parts in FIGS. 1 and 2. These depressions correspond to the depression formed in the construction shown in FIG. 2 resulting from the extension of the cords 14 under emergency conditions. However, since these areas 17 are always depressed, it is preferable to provide two such areas in opposed relation to keep the dividing wall in balance. It is even possible to use three or more depressions which would be equally spaced about the periphery so as not to disturb the balance. Of course, the construction shown in FIG. 2 could be constructed to provide two or more low areas, if desired.

Figure 4:
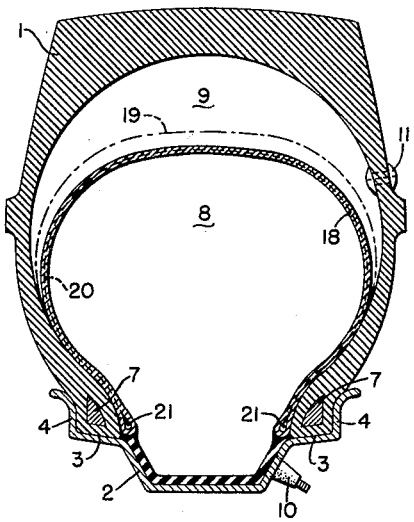
FIG. 4 shows a still further modification of the invention using an inner tube.

In FIG. 4 there is shown an inner tube 18 which has a restricted periphery so that even when air is lost from the outer chamber the tube will not fill the tire casing. The outer wall of the inner tube may be constructed either as shown in FIGS. 1 and 2 or as in FIG. 3. In other words, a portion of the tube's circumference is caused to expand under emergency conditions leaving restricted areas the same as in FIG. 2. Those portions of the inner tube that are permitted to expand, expand from the solid line position shown in FIG. 4 to the dotted line position 19. Note that in expanding, there is lateral expansion or run-out as well as radial expansion or run-out whereby there is an irregular surface presented to the sidewalls of the tire 1 as well as to the inner circumference of the tire. The vibration caused by this lateral run-out is not as great, of course, as that caused by the radial run-out. Nevertheless, it does assist in causing vibration and helps to minimize the amount of radial expansion that is necessary for the dividing wall.

As shown, the tube is provided with a reinforced fabric layer 20 similar to that in FIG. 7 but the edges of the layer are wrapped about inextensible beads 21 embedded in the sidewalls of the tube near the rim. The reinforced layer will be made of cords such as 13 and 14 as in FIGS. 5, 6 and 7 to give similar expansion characteristics to the outer circumferential wall of the tube as to the wall of the diaphragm in FIG. 2. Alternatively the outer circumference may have permanent depressions molded therein as in FIG. 3.

In FIGS. 5, 6 and 7 there is shown diagrammatically the method of constructing the outer circumference of the diaphragm, which method may also be used in building the outer wall of the tube 18 in FIG. 4. In building the diaphragm, it is first built into a cylindrical band and then expanded at the center to give it the outwardly-bowed appearance in FIG. 1. In each of FIGS. 5 and 6 there is shown one ply of bias cut fabric having cords 13 and 14 respectively embedded in rubber. The cords 13 are the less extensible cords shown in FIG. 2. By contrast, the cords 14 are more highly stretchable, and to distinguish the two sets of cords, the cords 14 are shown by lighter lines than the cords 13. In FIG. 6 there is shown the second ply which is made up in the same manner as the ply shown in FIG. 5, but with the cords arranged at an opposite angle to the cords in FIG. 5, so that when the two layers are placed one upon the other, as in FIG. 7, the cords will cross each other. Due to the fact that the cords 13 overlap more along the center line of the fabric than near the edges thereof, there will be no sharp change in the circumferential surface at the points where the cords 13 and 14 meet, and the resulting curvature circumferentially will be somewhat abrupt but not sharp as shown in FIG. 2 at 22. It is desirable to have a somewhat abrupt curvature at this point to insure that a definite vibration is imparted to the wheel under emergency conditions.

It will be noted that with the construction shown in FIGS. 5, 6 and 7, it is possible to manufacture the diaphragm on a building drum the same as if the cords were all of the same stretchability. It is only necessary to initially splice together lengths of bias cut fabric having cords such as 13 and 14 and then lay the composite fabric about the building drum the same as if each had the same stretchability. Then, by uniformly expanding the center of the diaphragm and employing molds with a uniform cross-section circumferentially the diaphragm will assume a uniform outer circumference. Under normal conditions with both chambers inflated, the cords preferably have sufficient stretch resistance to prevent expansion to the dotted line position 15 in FIG. 2, providing the pressures in the chambers 8 and 9 are substantially equal.

Thus, it will be seen that essentially there are two different constructions contemplated by this invention, one in which the dividing wall is normally of uniform diameter as in FIG. 2 and the other in which the diaphragm is always non-uniform in diameter as in FIG. 3. To make a permanently non-uniform diameter wall, however, requires that the building and molding apparatus be changed to suit the molded shape required. Thus, if it is found necessary to change the circumferential length or radial depth of the depression in FIG. 3, then the building and molding equipment must be changed. However, with a diaphragm made according to FIG. 2, the length of the depressed portion may be changed at will merely by changing the length of the bias cut sections of cords such as 13 and 14.

It will be noted in FIGS. 5, 6 and 7 that the cords in the different plies are arranged so that one quarter of each ply length includes low-stretch cords 13 and the rest of each ply includes high-stretch cords 14. In these figures the length of the fabric is intended to designate the total circumference of the diaphragm.

FIGS. 8 and 9 show two alternative constructions for the circumference of the dividing wall, but in these views no attempt has been made to show the cord fabric and its specific arrangement as in FIG. 7. Basically in FIG. 8 there may be alternate sections of hard rubber 23 which have more stretchability than the intermediate cord layers 24. In FIG. 9 there is shown alternate sections employing single plies 25 of cords having some stretchability and double plies 26 using the same cords. The additional strength offered by the double plies causes a greater restriction of that section to effect depressed portions as in FIG. 2. These examples are illustrated only and are not to be considered as restrictive of the manner in which the non-uniform expansion at the circumference may be obtained.

With any of the forms of the invention shown the normal riding characteristics of the dividing wall are substantially the same as in prior constructions made of uniform construction and diameter throughout. In the event the air pressure in the inner chamber exceeds that of the outer chamber as when a blowout or slow leak occurs, a depression is provided in the tread surface of the inner compartment or tire so that when running on the inner circumference of the tire a vibration will be set up which will be transmitted to the wheel and to the vehicle sufficient to cause the driver to become aware of the fact that something is wrong. The amount of vibration, of course, should be governed to such an extent that while sufficient to cause the driver to sit up and take notice, it will not be sufficient to cause him to feel unsafe if he continues to operate the vehicle at normal speeds. While circumstances may require varying the circumferential length or depth of the operative depression, a circumferential length of 90° of the circumference and a depth of the order of ⅜" to ¾" will be satisfactory for most passenger tires and provide adequate vibration without inducing sufficient vibration to make operation under emergency conditions, dangerous.

It will be noted that this invention requires only that there be a little more labor involved in building the dividing wall and this labor is primarily used in making up the individual plies of fabric to get the desired areas of greater and lesser stretchability. The molding can be accomplished the same as if the plies were of uniform characteristics.

It will be noted that in any of the constructions shown there is a built in warning device that a rugged and ready to go into operation immediately upon tire failure and that the cost is relatively low. There are no complicated parts to get out of order so that even after several years of operation, the warning will be given as effectively as immediately after first use. The amount of vibration can be regulated by the depth of depressions and their length as may be required, bearing in mind that changes in design and size may require more or less impact to sound a suitable warning.

While certain representative embodiments and details have been shown for the purpose of illustrating the invention, it will be apparent to those skilled in the art that various changes and modifications may be made therein without departing from the spirit or scope of the invention.

Having thus fully described this invention, what I claim and desire to secure by Letters Patent of the United States is:

1. In combination, a tubeless tire and a rim upon which it is mounted to form an annular air container, an annular wall provided in said container to divide it into radially disposed inner and outer chambers to be inflated by air under pressure, and valve means by which said chambers, may be inflated, said wall having an outer circumference sufficiently less than the inner circumference of said tire adjacent the tread to keep it out of contact with said inner circumference of said tire during normal operation with both chambers inflated but having a sufficient circumference to provide a large volume of air in the inner chamber to provide for safe continued operation for a great distance under emergency conditions and said wall under emergency conditions, when the outer chamber is deflated, forming a tread for the inner chamber, said wall being so constructed as to provide at least one circumferentially extending and radially projecting protuberance on the outer surface of said wall subject to the pressure in the inner chamber during emergency operation to cause sensible vibration of the rim as said wall operates on the inner circumference of the tire, and said wall being constructed of strain-resistant materials to limit expansion of its outer circumference under normal and emergency operation to a circumference less than that of the inner circumference of said tire.

2. The combination set forth in claim 1 in which the thickness of the material in said protuberance is substantially the same as in the other portions of said wall.

3. The combination set forth in claim 1 in which the protuberance is permanently formed on the wall and exists during normal as well as emergency operation.

4. The combination as set forth in claim 1 in which the said protuberance extends for more than 120° of the circumference of said wall.

5. The combination as set forth in claim 1 in which the said protuberance extends for a circumferential distance in the order of 180°.

6. The combination as set forth in claim 1 in which the protuberance at its circumference extends a radial distance in the order of ¾" from other circumferential portions of the wall.

7. The combination as set forth in claim 1 in which there is an additional protuberance spaced circumferentially from the first protuberance and diametrically opposed to said first protubreance.

8. The combination as set forth in claim 3 in which there is an additional similar protuberance thereon spaced circumferentially from the first protuberance and diametrically opposed to said first protuberance.

9. The combination as set forth in claim 1 in which the said wall at its outer circumference, when unstressed is shaped concentrically and is constructed with a circumferential section that may expand a greater amount than adjacent circumferential sections whereby in use, when only the outer chamber is deflated, the pressure in the inner chamber will expand said first section a greater radial distance than the adjacent sections to form said protuberance during emergency operation.

10. The combination as set forth in claim 9 in which the first section is constructed of expansion-restraining cords having greater stretch than the cords in the adjacent sections.

11. The combination as set forth in claim 9 in which the first section is constructed of expansion-restraining cords having substantial stretch and the adjacent sections are constructed of cords having substantially no stretch.

12. The combination set forth in claim 9 in which said first section is formed by using somewhat stretchable material therein throughout the circumference of said wall and a portion only of its circumference is restrained against stretching by stretch resistant cords embodied in said portion.

13. The combination set forth in claim 9 in which said first section is formed by using somewhat stretchable restraining cords throughout 360° of the circumference of said wall and then restricting against radial expansion, a portion only of said wall's circumference by a stretch-resistant wire armor embodied in said latter portion.

14. The combination set forth in claim 9 in which the said wall throughout 360° of its circumference includes somewhat stretchable cords of substantially equal stretchability and in substantially less than 360° of said circumference and restraining portions of said circumference by providing expansion-restraining materials for resisting normal stretching of said tread cords.

15. The combination as set forth in claim 9 in which said wall is provided with at least one additional section similar to said first section and spaced circumferentially from said first section.

16. The combination of a tubeless tire for a motor vehicle, a wheel rim supporting said tire, and a flexible safety member within said tire extending between the opposite side walls of said tire to divide the space between said tire and said wheel rim into an inner generally tubular air chamber between said safety member and said rim and an outer annular chamber between said safety member and said tire, said flexible safety member having a plurality of circumferentially spaced lobes on its outer periphery when inflated, said lobes being spaced radially inwardly from said tire when both chambers are inflated but engaged by said tire when said outer chamber is deflated to cause vibrations warning the vehicle operator of the deflated condition of said tire.

17. The combination of a tubeless tire for a motor vehicle, a wheel rim supporting said tire, and a flexible safety member within said tire extending between the opposite side walls of said tire to divide the space between the said tire and said wheel rim into an inner generally tubular air chamber between said safety member and said rim and an outer annular chamber between said safety member and said tire, said flexible safety member having at least one radially projecting lobe on its outer periphery when inflated, said lobe being spaced radially inwardly from said tire when both chambers are inflated but engaged by said tire when said outer chamber is deflated to cause vibrations warning the vehicle operator of the deflated condition of said tire.

18. In combination, a tubeless tire for a vehicle, a wheel rim having seats supporting the beads of said tire, and a flexible safety member extending from bead to bead and dividing the interior of said tire into an inner compartment and an outer compartment, the outer periphery of said flexible safety member being formed with a series of circumferentially spaced undulations normally inoperative when balanced by air pressure in said inner and outer air compartments but effective to retain its irregular peripheral shape upon collapse of the outer compartment and produce vibration noticeable to the vehicle driver when the vehicle is operated.

19. In combination, a tubeless tire for a vehicle, a wheel rim having seats supporting the beads of said tire, and a flexible safety member extending from bead to bead and dividing the interior of said tire into an inner compartment and an outer compartment, said flexible safety member having a portion of its outer periphery offset radially from the average diameter of said safety member, said safety member providing a radially irregular support for said tire upon the collapse of said outer compartment to produce vibration noticeable to the vehicle driver when the vehicle is operated with a collapsed outer compartment.

20. In combination, a tire for a motor vehicle, a wheel having a rim with seats supporting the beads of said tire, a sheet-like safety member extending between the opposite side walls of said tire and having its edges trapped between the beads of said tire and said seats, said member dividing the space between said tire and said wheel rim into concentric inner and outer annular air chambers, said member having a few circumferentially spaced apart lobes on its outer periphery when inflated, said lobes being spaced radially inwardly from said tire when both chambers are inflated but engaged by said tire when said outer chamber is deflated.

References Cited in the file of this patent

UNITED STATES PATENTS

| | | |
|---|---|---|
| 944,971 | Silverman et al. | Dec. 28, 1909 |
| 2,339,548 | Wilson | Jan. 18, 1944 |

FOREIGN PATENTS

| | | |
|---|---|---|
| 1,163,953 | France | May 5, 1958 |